Figure 5:
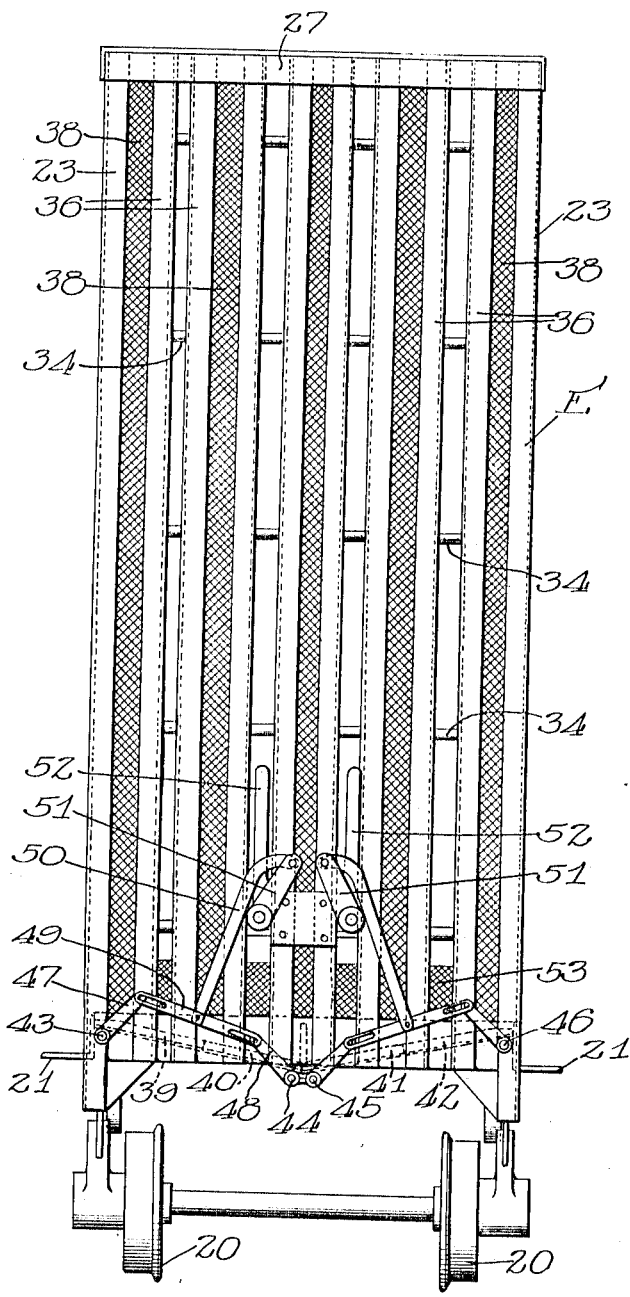

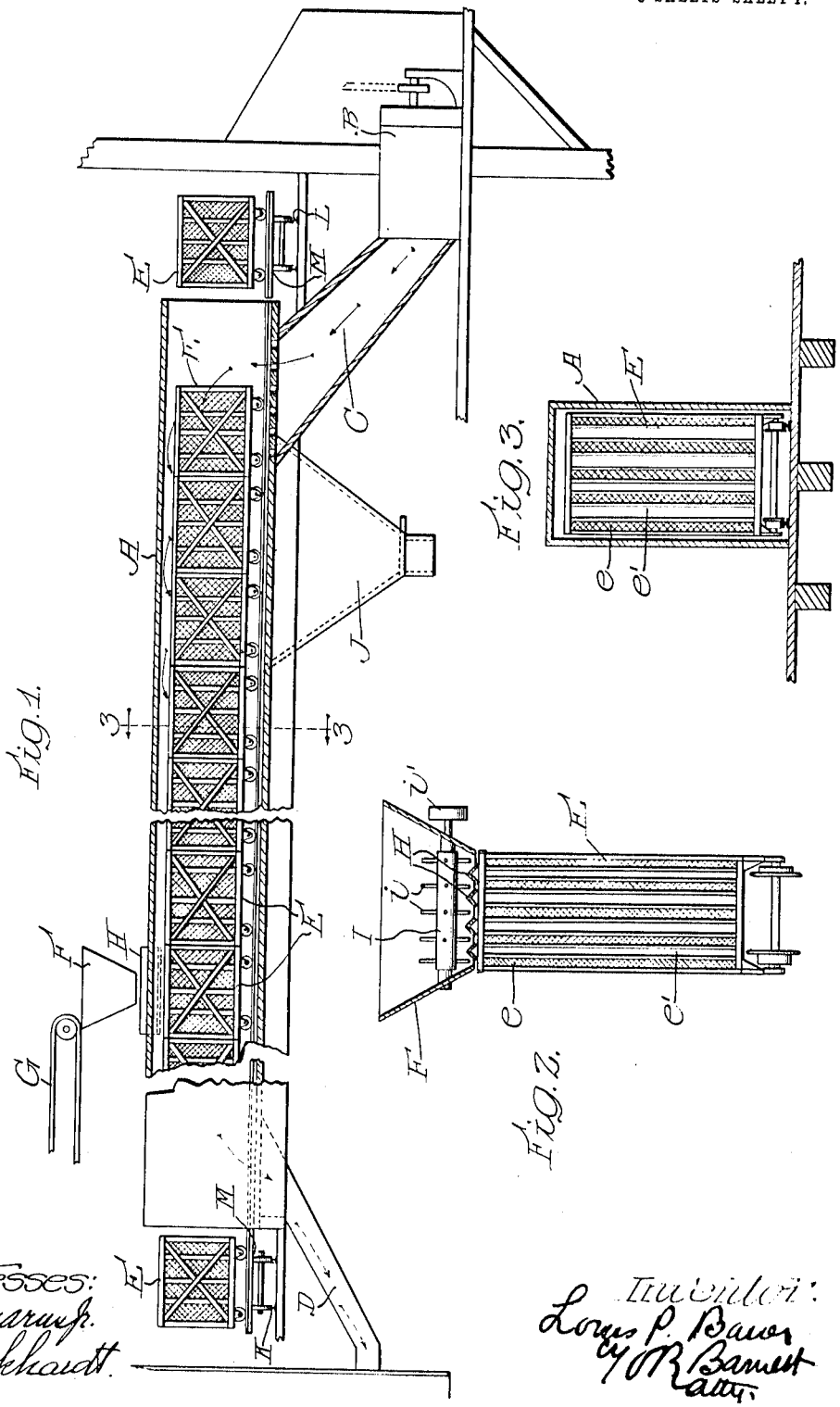

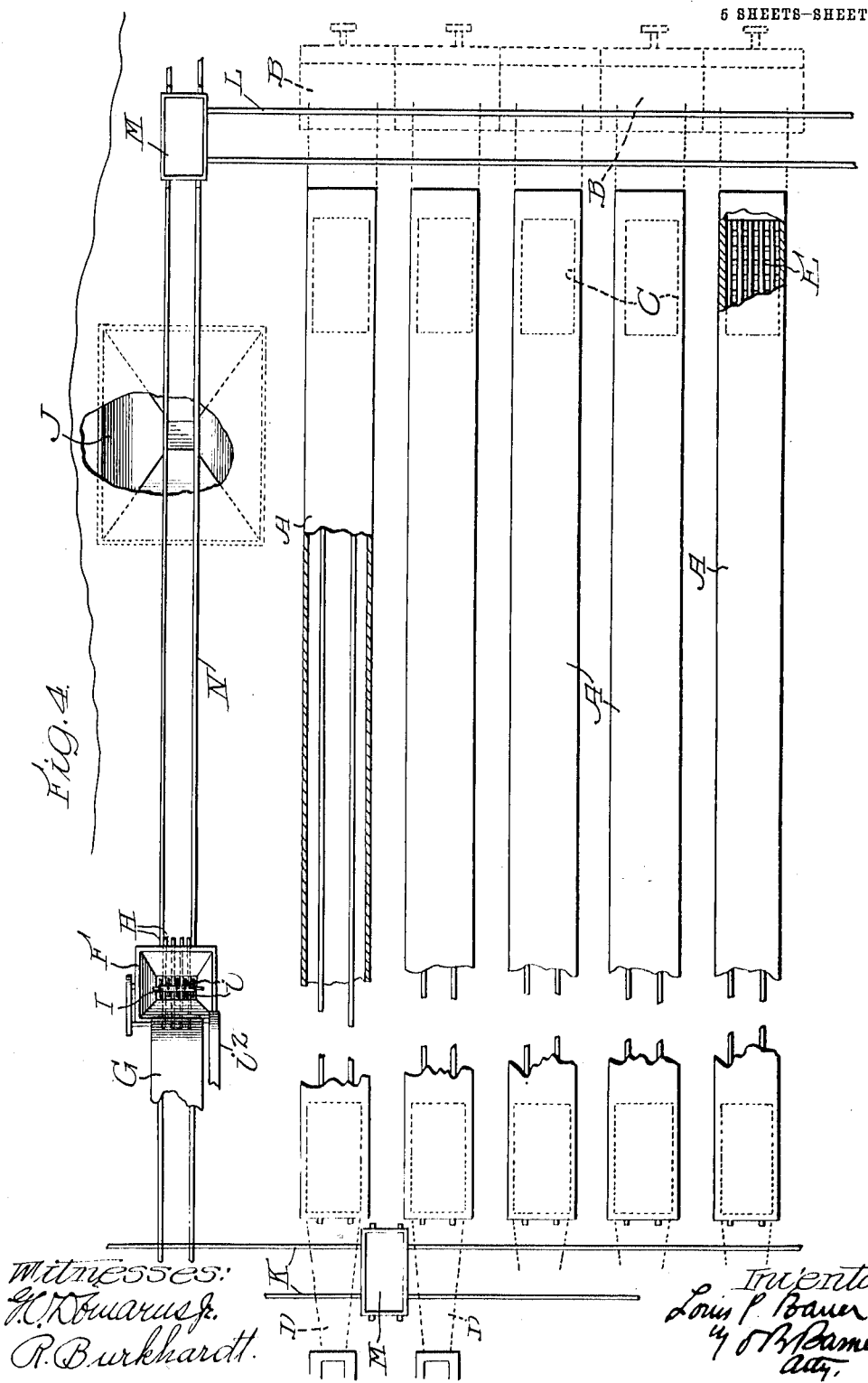

L. P. BAUER.
METHOD OF DRYING STARCH.
APPLICATION FILED DEC. 6, 1911.

1,035,302.

Patented Aug. 13, 1912.

5 SHEETS—SHEET 3.

Witnesses:
G. W. Kmarus Jr.
R. Burkhardt.

Inventor
Louis P. Bauer
by T. B. Barnett
Atty.

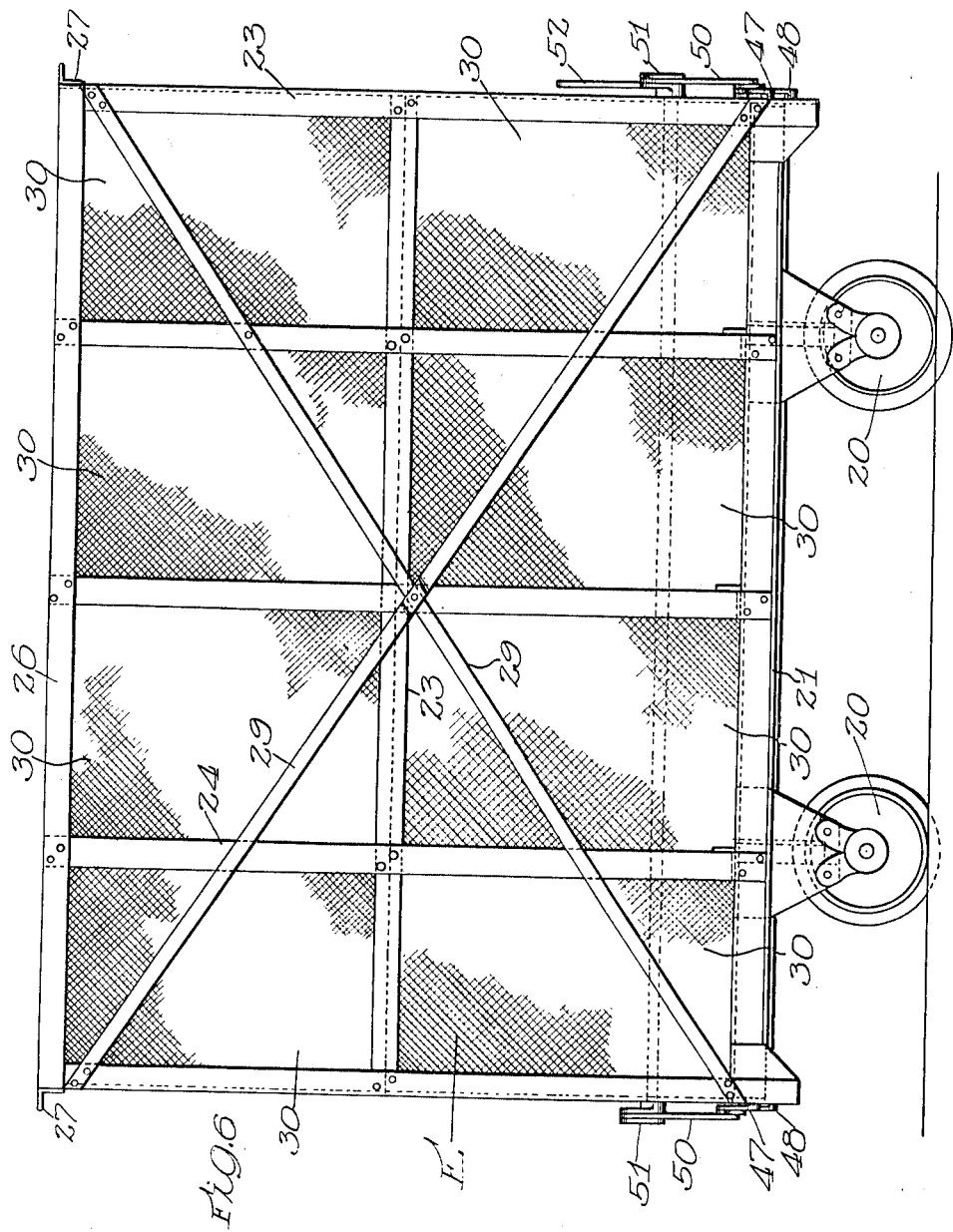

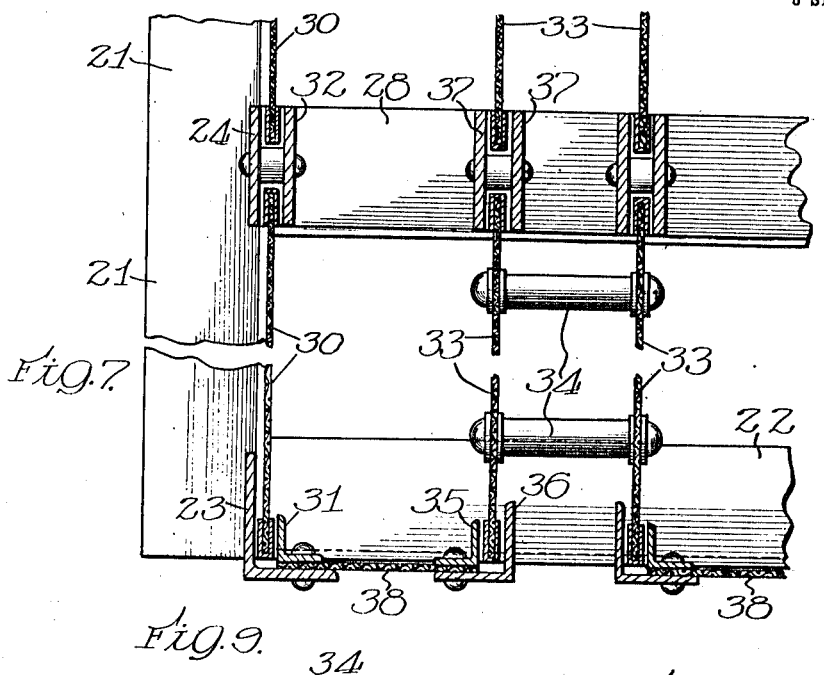

UNITED STATES PATENT OFFICE.

LOUIS P. BAUER, OF PEKIN, ILLINOIS, ASSIGNOR TO CORN PRODUCTS REFINING COMPANY, A CORPORATION OF NEW JERSEY.

METHOD OF DRYING STARCH.

1,035,302.

Specification of Letters Patent.

Patented Aug. 13, 1912.

Application filed December 6, 1911. Serial No. 664,154.

*To all whom it may concern:*

Be it known that I, LOUIS P. BAUER, a citizen of the United States, residing at Pekin, in the county of Tazewell and State of Illinois, have invented certain new and useful Improvements in Methods of Drying Starch, of which the following is a specification.

My invention relates to the manufacture of starch and particularly to the operation of drying the starch after it is taken from the starch tables; and the object of the invention is to provide a novel method of drying the starch which improves, facilitates and cheapens this operation, particularly by providing a better and more economical disposition of the starch in the kiln or tunnel, whereby the amount of heat required is decreased and the starch more uniformly dried throughout to the desired degree, and further, by the practical elimination of hand labor during the entire period from the time the starch is taken from the starch tables until it is delivered in dry condition ready for use.

According to the method which has been prevalent in starch factories for some little time the starch after being removed from the tables and broken up into lumps is spread out in relatively thin layers, the thickness of which is made as uniform as possible, upon trays consisting of wooden frames having burlap bottoms. These trays are then lifted by hand and placed in wagons constructed so that the trays are spaced apart one above the other and the wagons caused to be passed through a long kiln or tunnel, as it is called, through which hot air is forced in the direction opposite to the movement of the wagons. When the wagons issue from the opposite end of the tunnel they are taken to a place of discharge and the trays removed by hand, one by one, and the dry starch dumped from them. This method of drying the starch, although it has been a common method for some little time, has a number of disadvantageous features which starch manufacturers have recognized and considerable effort has been made to improve upon the method but, so far as I am aware, without any practical success until I devised the improved method herein described.

One of the defects of the prevalent system is that the trays have to be loaded and unloaded by hand, which makes the operation expensive. Another disadvantage is that it is difficult to get the starch dried uniformly throughout to the proper degree. The material coming from the tables contains about fifty per cent. of water. Commercial starches, for example, are supposed to contain from 10 to 15 per cent. of moisture. It is desirable that the degree of moisture should be maintained at a given ratio, dependent upon the use to which the starch is to be put, and it is also important that the starch should be uniformly dried. With the present method uniformity is difficult because with the lumps of wet starch, varying in size, it is very hard to get the layers of the starch on the trays of even thickness. The thicker layers necessarily take longer to dry and because they are thicker the circulation space above them is proportionately decreased. Furthermore, the layers of starch are exposed to the heat only on one side, the under side being protected against the heat by the burlap bottoms of the trays. There is another disadvantage arising from the horizontal disposition of the starch. The starch wagons enter the tunnel at the end from which the moisture laden air issues. With the starch arranged in horizontal layers, the upper surfaces of which are uneven, due to the lumpy character of the starch, a part of the moisture in the air is certain to be condensed by contact with the cold starch and by being deposited on the cold starch makes it wetter than it was when coming from the tables. This means, of course, that the amount of heat required to dry a given amount of starch is increased by just so much. To remedy these defects in the prevalent methods of drying, or at least some of them, it has been proposed, for example, to use automatic conveyers for transporting the starch through the kiln. This plan, however, has not worked out successfully for various reasons which need not be detailed. It has been sought to remedy one of the chief of these disadvantages, the loading and unloading of the trays by hand, by the provision of some form of machinery for accomplishing this operation. This plan has not proven successful.

According to my improved method the starch, instead of being spread out in horizontally extended layers, which necessarily are uneven and vary in thickness, is disposed in thin bodies which are vertically arranged, or substantially so, and which are preferably uniform in thickness. These bodies are spaced apart, the starch in each body being supported by foraminous walls, or other suitable means, so that each body is exposed directly to the action of the hot air on two sides instead of only on one side, as in the old system. As the bodies of starch may be made uniform in thickness it follows that when they are disposed side by side in the kiln or tunnel the circulation spaces between them are always perfectly uniform so that each unit is subjected to exactly the same amount of heat. This disposition of the units also minimizes the tendency for the starch to collect condensation from the vapor laden air near the air outlet.

In carrying out my process I preferably provide a plurality of wagons or receptacles which have foraminous sides and which are divided into relatively thin starch compartments and intervening air spaces by vertical, or substantially vertical, foraminous partitions. This arrangement makes it possible to feed wet starch by a continuous automatic operation into the top of the wagons and to discharge the dry starch from the bottom of the compartments by gravity. The dumping can be performed either by shifting a hand lever or by any suitable automatic mechanism as may be found most convenient. The vertical disposition of the units allows the receptacles or wagons to be made entirely of metal. An effort has been made to use wire screen for the bottoms of the ordinary starch trays but it was not found advisable to so construct the trays for various reasons. The use of the burlap bottoms and wood frames, wood being used so that the burlap can be conveniently nailed to the frame and removed when it wears out, besides making the life of the trays very short and requiring continual repairing, has made it necessary to very carefully look over the dry starch and remove the nails, splinters of wood, pieces of burlap, etc., which, because of the rapid deterioration of the trays, are certain to be found mixed with the starch. I have also found that with a starch wagon constructed so as to dispose the starch in the vertically extended units instead of horizontal layers the capacity of the wagon may be doubled which, of course, decreases the equipment necessary for drying a given amount of the material. Furthermore, this disposition of the material is so much better that the starch in a given wagon will dry in practically the same time as was required to dry half the amount according to the old method.

The invention is illustrated in the accompanying drawings, which show, somewhat diagrammatically in certain respects, an apparatus suitable for carrying out my process, in which—

Figure 1 is a sectional elevation of this apparatus, Fig. 2, a vertical section taken through the filling hopper, and the wagon filling beneath the same; Fig. 3, a sectional view taken through one of the tunnels on line 3—3 of Fig. 1, looking in the direction of the arrows; Fig. 4, a plan view of the apparatus with certain parts in section; Fig. 5, an end elevation of a preferred form of carrier or wagon; Fig. 6, a side elevation of the same; Fig. 7, a fragmentary sectional plan of the same; Fig. 8, a fragmentary vertical section of the lower part of the wagon, and Fig. 9, a view of one of the screens which make up the foraminous partitions of the wagon.

Like characters of reference indicate like parts in the several figures of the drawings.

Referring first to Figs. 1 to 4 inclusive, A designates the starch tunnels, B the fans by means of which air, heated to a suitable temperature by heating devices (not shown), is forced into the tunnels through the inlets C, and D the air outlets at the other end of the tunnels. E designates the carriers or starch wagons constructed so as to dispose the starch in relatively thin vertically extended bodies $e$ separated by the circulation spaces $e'$. F designates a filling hopper to which the wet starch from the starch tables is transported by any suitable means, for example, by means of the belt conveyer G. On the under side of the hopper are the angle sheds H which, when the car is being filled, stand over the circulation spaces $e'$. In the hopper is a breaker I provided with projecting pins or arms $i$ which stand over the spaces between the sheds H. The breaker is rotatably mounted and provided with a pulley $i'$ adapted to be driven by belt $i^2$. J designates a hopper into which the dry starch is discharged. Tracks K and L are provided at the opposite ends of the tunnels on which run the transfer trucks M. The track N extends under the filling hopper F and above the discharge hopper J. The wagons are filled from the hopper F and moved along the track N to the transfer truck N' on track K by means of which they are taken to one of the tunnels A. Preferably the tunnels are kept filled with the wagons, a wagon being taken out at one end as a freshly filled wagon is put in at the other. The wagons issuing from the tunnels are transported on the transfer truck on track L to the track N whence they go to the discharge hopper J. The wagons are constructed, as will be hereinafter described, so that the dry starch is dumped from the compartments by gravity.

My process may obviously be carried out by the use of wagons or carriers differing considerably in their construction. In Figs. 5 to 9 inclusive I have shown the construction of a carrier which has been successfully used for this purpose. The wagon is supported on wheels 20 and the framework is made up of the angle iron side sills 21, the angle iron end sills 22, angle iron corner posts 23, the uprights 24, the longitudinal frame members 26, the upper end frame members 27, angle iron cross struts 28, and the diagonal side braces 29. The foraminous sides of the wagon are made up preferably of screens 30. These screens are kept in place by the angle irons 31, at the corners of the car, and the strips 32 secured to and spaced from the uprights 24. The partitions dividing the cars into starch compartments and intervening circulation spaces are preferably formed of pairs of screens 33, the screens of each pair being secured together by the spacing bolts 34. The partition screens are held in place, at the end of the car, between the angle bars 35 and 36 and at the intermediate places between the uprights 37. The starch compartments are preferably closed at the ends by the screens 38.

The bottom preferably extends under the circulation spaces as well as the starch compartments so that if any dry starch sifts through the screens it is collected in the bottom of the wagon and does not fall out into the tunnel. The bottom, in the construction shown, consists of four leaves 39, 40, 41 and 42, secured respectively to the rock shafts 43, 44, 45 and 46, the rock shafts 43 and 44 being provided, at one end of the car, with the levers 47 and 48 connected by the slotted link 49, which latter is connected by a link 50 to an end of a lever 51 pivotally mounted on the end of the wagon and provided with a handle 52. By manipulation of this mechanism the bottom leaves 39 and 40 may be either locked in their closed position or allowed to drop to the open or vertical position. A similar mechanism is employed for operating the bottom leaves 41, 42. It will be seen from Fig. 8 that the starch from the compartments spreads out to a certain extent in the space below the compartments and circulation spaces. The starch when it is first fed into the wagon is sticky and this circumstance prevents it from packing down in the compartments and forming a homogeneous mass. The lumps, on the contrary, stick to the screens on opposite sides of the compartment so as to keep the material in a condition pervious to the hot air. Although there is very considerable shrinkage during the drying operation the starch does not pack down to any considerable extent. When the bottoms are thrown open and the considerable body of starch collected in the open space between the bottoms and the compartments is dumped, this impulse starts the thin bodies of starch above in the starch compartments and all these masses crumble and collapse so that the discharge from the wagon is complete. The lower ends of the circulation spaces are preferably closed by screens 53 to prevent any loss of the fine starch.

While I have shown and described a form of apparatus which has been found suitable and convenient for carrying out my process of drying the starch it will be readily understood that the process could be carried out by apparatus of different character so that the process is not limited to the particular apparatus herein disclosed.

I have used the term "bodies of starch" in describing and claiming the method of disposing the starch in the drying operation, but it will be understood that I do not intend by this that the starch in the compartments is packed into a close homogeneous mass. On the contrary these bodies are preferably somewhat loose agglomerations of lumps or pieces of starch.

In using the term "upright" as applied to the disposition of the bodies it should be understood that I intend the position of the bodies which is substantially vertical, having in view the purpose of this disposition. The bodies might, of course, be slightly inclined from the vertical although to get the best results, both in drying the starch and in subsequently discharging it, I apprehend that a perfectly vertical arrangement is preferable.

I do not claim herein the particular form of apparatus disclosed as a suitable form of apparatus for carrying out the process herein claimed is described and claimed in my pending application Serial No. 584,619, filed September 30, 1910.

I claim:

1. The method of drying starch which consists in disposing the starch in a plurality of extended thin bodies arranged in upright position with their sides exposed, and causing hot air to pass along said bodies in contact with said exposed sides.

2. The method of drying starch which consists in disposing the starch in a plurality of upright extended thin bodies having their sides exposed and arranged side by side and spaced apart so as to provide circulation spaces between said exposed sides and causing hot air to be passed horizontally through said circulation spaces between said bodies so that as it becomes laden with moisture it sinks and is replaced from above by fresh, dry, hot air.

3. The method of drying starch which consists in disposing the starch in extended thin bodies arranged in upright position, the sides of which are exposed, and causing the bodies of starch disposed with their sides parallel to the direction of movement to be advanced intermittently through an inclosed passageway against a draft of hot air forced therethrough in the opposite direction.

4. The method of drying starch which consists in disposing the starch in upright extended thin bodies having their sides exposed, and arranged in groups side by side, and with the bodies of adjacent groups end to end, so as to provide continuous circulation spaces and causing said bodies so disposed to be advanced intermittently in a direction parallel to said bodies through an inclosed passageway against a draft of hot air forced therethrough in the opposite direction.

LOUIS P. BAUER.

Witnesses:
P. H. TRUMAN,
L. A. FALKENBERG.